Jan. 23, 1940.  C. S. WEYANDT  2,187,717
VIBRATORY ELECTRICAL APPARATUS
Filed Oct. 21, 1936  6 Sheets-Sheet 2

INVENTOR.
CARL S. WEYANDT
BY Lewis D. Konigsford
ATTORNEY.

Jan. 23, 1940.　　　　C. S. WEYANDT　　　　2,187,717
VIBRATORY ELECTRICAL APPARATUS
Filed Oct. 21, 1936　　　6 Sheets-Sheet 3

INVENTOR.
CARL S. WEYANDT
BY Lewis D. Konigsford
ATTORNEY.

Jan. 23, 1940. C. S. WEYANDT 2,187,717
VIBRATORY ELECTRICAL APPARATUS
Filed Oct. 21, 1936 6 Sheets-Sheet 4

INVENTOR.
CARL S. WEYANDT.
BY Lewis D. Konigsford
ATTORNEY.

Jan. 23, 1940.  C. S. WEYANDT  2,187,717
VIBRATORY ELECTRICAL APPARATUS
Filed Oct. 21, 1936  6 Sheets-Sheet 5

INVENTOR.
CARL S. WEYANDT
BY Lewis D. Konigsford
ATTORNEY.

Jan. 23, 1940.  C. S. WEYANDT  2,187,717
VIBRATORY ELECTRICAL APPARATUS
Filed Oct. 21, 1936  6 Sheets-Sheet 6

INVENTOR.
CARL S. WEYANDT
BY Lewis D. Koningsford
ATTORNEY.

Patented Jan. 23, 1940

2,187,717

UNITED STATES PATENT OFFICE 2,187,717

VIBRATORY ELECTRICAL APPARATUS

Carl S. Weyandt, Pittsburgh, Pa.

Application October 21, 1936, Serial No. 106,851
In Great Britain November 8, 1935

13 Claims. (Cl. 198—220)

This invention relates to a new reciprocatory or vibratory electric motor and method of operating the same which are applicable to a variety of uses, and which are particularly applicable to the operation of reciprocatory or oscillatory conveyors. The invention also relates to the art of conveying or handling non-mobile or semi-mobile materials, such as pastes, powders, sand, gravel, packages, articles and the like, and relates in particular to methods and apparatus for feeding the same in a controlled or regulated movement.

It has heretofore been proposed to employ the principle of resonance in vibratory electric motors by having an armature connected to a spring and subjected to electromagnetic impulses developed by an alternating current passing through the solenoid, the natural period of vibration of the spring being the same or in resonance with the alternating current through the solenoid that produces the electromagnetic impulses. However, the disadvantage of a motor of this kind is that it is very sensitive, and changes in load are liable to change the natural period of vibration of the spring so as to destroy the condition of resonance and render the motor inoperative or change its amplitude of operation. To overcome this condition it heretofore has been proposed to connect a heavy mass or dead weight to the spring that has high potential energy so that changes in load will practically negligibly change the period of the whole vibrating mass or portion of the motor and thus negligibly affect the amplitude of vibration thereof. However, the massiveness of such motors is a serious disadvantage to their general use.

According to one feature of the present invention, I provide a vibratory or reciprocatory electric motor in which an armature is secured to a vibratory element for unobstructed vibration and is reciprocated by electromagnetic impulses developed by a unidirectional pulsating electric current with substantial predetermined periods of zero energy between pulsations passing through a solenoid, the free vibration period of the vibratory element being selected or adjusted to be non-synchronous to the recurrence period or frequency of the current impulses. As a result, the vibrations of the vibratory element are forced into synchronism with the current impulses with a periodic motion that results in a rhythmical differential vibration or reciprocation of particular value for operating vibratory conveyors. Preferably the pulsating current is selected by asymmetrical conduction from an alternating current source, the current impulses being separated by periods of zero energy. Thus a vibration of large amplitude is obtained from an alternating current source without the necessity of resonance and its accompanying disadvantage of sensitivity.

I prefer to so select or adjust the free vibration period of the vibratory element that the amplitude of forced vibration occurs unequally on opposite sides of the neutral axis of vibration. This condition is satisfactorily accomplished when the periodicity of the vibratory element is about two-thirds to eleven-twelfths of the frequency of the alternating current source, although I do not intend my invention to be limited to these precise limits, as the nearness to which natural synchronism may be approached will depend on certain conditions of operation. However, by maintaining the periodicity of free vibration of the vibratory member in sub-synchronous relation to the frequency of the alternating current source under all conditions of operation I eliminate the disadvantage of sensitivity that exists when a naturally synchronous relationship is employed, and therefore it is not necessary to add any dead weight or mass to the resilient element to keep the motor in uniform operation under variable conditions of load. Preferably the vibratory element comprises two leaf springs oppositely biased so that an increase in load deflects one of the springs toward the electromagnet thus decreasing the air gap and at the same time increasing the stored energy in that vibratory element while decreasing the stored energy in the other vibratory element.

In a preferred modification I employ one or more vibratory elements following a pseudo-harmonic law of vibration, that is, such that the period of free vibration is dependent on the amplitude of vibration, thus rendering a condition of resonance with the current impulses and continuous building up of amplitude impossible during operation. This pseudo-harmonic vibration may be obtained by selection of a vibratory element of such material that the deflection under load is not proportional to the load, or in any other suitable way, as by so mounting a vibratory element which normally deflects proportionately to the load, or so mounting the load, that the resulting deflection is no longer proportional to the load. As suitable materials of the first kind may be mentioned rubber in which the modulus of elasticity increases with elongation, and cast iron, in which the modulus of elasticity decreases with elongation. As examples of the second kind may be mentioned a cantilever mounted steel leaf spring built in between cylindrical or tapered bearing members. Therefore it will be understood that where in the specification and claims I refer to a vibratory element having a pseudo-harmonic law of vibration, I intend to include and cover all the foregoing illustrative materials and/or conditions. In employing such vibratory elements I prefer to operate the motor at an amplitude of vibration such that the periodicity of the vibratory element at that amplitude is less or else is an integral multiple several times removed of the frequency of the alternating current source so as to maintain a stable amplitude of forced vibration.

In applying my invention to the operation of a vibratory conveyor, a conveyor trough is secured in any suitable manner to the armature of the motor, and one or more resilient elements secured to a base guide the trough so as to follow susbtantially the movements of the armature, the axis of vibration of the resilient element or elements preferably being inclined to the vertical whereby the force of gravity acts in one direction as an accelerating force and in the other direction as a decelerating force. Furthermore the motor is arranged in such relation to the trough that any substantial increase in weight of material on the trough will tend to deflect the resilient element or elements so as to decrease the air gap between the armature and electromagnet and thus increase the power of the motor. The base of the motor is mounted on a vibratory element such that the base and its mounting have a free vibration period substantially equal to that of the resilient element. This increases the feeding action of the conveyor.

The rate of feed of the conveyor depends among other things on the frequency of vibration and the amplitude of vibration thereof. Generally, as where commercially available current of 25, 30, 50 or 60 cycle is employed the current source imposes a definite limitation on the pulsation period of the electromagnetic impulse, and when it is desired to control or vary the rate of feed of the conveyor this preferably is accomplished by varying the current supplied to the motor which thus varies the amplitude of vibration of the conveyor. The rate of feed also depends on the relation between the free vibration period of the spring to the recurrence period of the current impulses, and the rate of feed therefore may be adjusted by suitable adjustment or selection of the free vibration period of the spring.

The vibratory conveyor of the present invention may be utilized alone or in conjunction with a hopper to feed materials thereto. In order to secure a greater degree of uniformity of flow I mount the hopper over the conveyor and vibrate the hopper walls to maintain the material in the hopper in a state of flux. The preferred type of hopper employed is in the form of a cone or other body preferably built up of two half sections and having substantially non-angular walls, as I have found that the angles in the walls of square or pyramidal hoppers interfere with the transmission of the type of vibration that I impart to the hopper walls so that with hoppers of such form it is necessary in many cases to have a vibrator for each side of such hopper. I prefer to utilize an inertia type of vibrator for vibrating the hopper, as such a vibrator is relatively noiseless and has a longer life than the impact type, and maintains the hopper walls in constant and substantially uniform vibration adjacent the apex of the hopper.

I have further found that when the conveyor is adjusted to a very slow rate of feed it is important to vibrate the hopper walls at the correct amount, depending on the character of the material and on other factors, to prevent bridging of the material or packing of the material in the hopper as at the slower rates of discharge of material from the hopper the material therein is more liable to form a bridge or clog in the hopper. It is therefore a further feature of my invention to provide independent control of the vibration of the hopper and of the conveyor, and in the preferred embodiment the vibrations of the conveyor and the hopper vibrations are insulated from each other by suitable vibration absorbers. Continuity of feed from the hopper is further assured by positioning the discharge opening of the hopper adjacent the conveyor to provide a feed opening choked by the material being fed from the hopper so that the vibratory conveyor acts as a vibratory gate to control the discharge therefrom. The feed opening provided between the hopper and conveyor may be adjusted as desired, as for example, for materials having different angles of repose respectively, by relative positioning of the hopper and conveyor.

A further feature of the present invention is the provision of automatic control means to maintain the rate of feed of the conveyor at a continuous or at an intermittent rate.

As a further feature of the invention I may employ a unidirectional pulsating current to operate the vibrator and the conveyor, one half wave of the alternating current source being utilized to operate the vibrator, and the other half wave being utilized to operate the conveyor.

Accordingly, it is an object of the present invention to provide a vibratory electric motor and methods of operating the same whereby a differential vibration may be obtained without resort to mechanical electrical contacts to make and break a circuit to provide a unidirectional pulsating current.

A further object of the invention is the provision of a vibratory electric motor that is not sensitive to changes in load and is of relatively light construction.

Still another object of the invention is the provision of a vibratory electric motor wherein a maximum differential of vibratory motion may be obtained for minimum current consumption.

Still another object is the provision of an electric motor which develops increased power with increases in load so as to substantially eliminate stalling of the motor.

Another object is the provision of an electric motor having an armature which is moved in one direction by a magnetic force and is moved in the opposite direction by a resilient member that may have a harmonic natural period or non-harmonic free period of vibration differing from the period of the magnetic force.

It is another object of the present invention to provide novel apparatus and methods for feeding, handling or conveying nonfluid materials at a controlled or uniform rate, which may be varied through a wide range.

A further object is the provision of an apparatus for feeding materials whereby material may be made to flow with or against the force of gravity.

Still another object is the provision of feeding apparatus which is automatic in operation and may be set and controlled to feed material at any predetermined rate.

A further object is the provision of a material conveying or feeding machine that is universal in character and may be employed for feeding or conveying a wide variety of materials.

Another object is to provide an improved method and apparatus for controlling the vibration of industrial reciprocating conveyors, feeders or vibrators whereby alternating current from the usual power sources commercially available is statically modified to be used for the operation thereof to produce a differential vibration or reciprocation.

Another object is the provision of an apparatus for feeding materials in which the material is kept in a state of agitation throughout its course.

Another object is the provision of a feeding apparatus which will not become clogged by oversize material.

A further object is the provision of feeding apparatus which responds instantaneously to adjustments in the current supply to vary the rate of feed, and in which the moving parts are light in weight so as to prevent overrunning upon change of adjustment.

Another object is the provision of feeding apparatus comprising a hopper for feeding material to a reciprocatory conveyor and in which the vibration of the hopper may be adjusted separately and independently of the vibration of the conveyor.

Still another object is the provision of a feeding apparatus which may be operated intermittently for slow feeds of hygroscopic or damp materials, and may be operated continuously for easy flowing materials at low or high rates of feed.

These and other objects will be apparent from a consideration of the following specification taken in connection with the accompanying drawings wherein.

Figure 1:
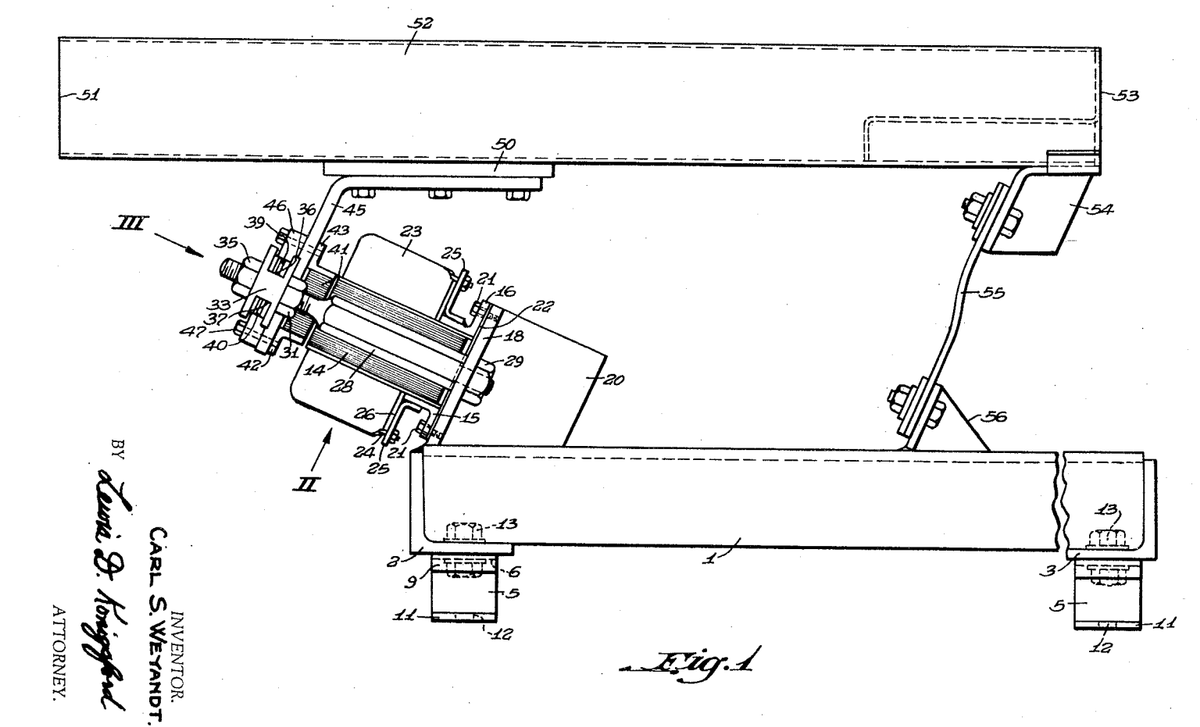
Figure 1 is a side elevation view of a preferred embodiment of my invention.

Referring to the drawings, the numeral 1 designates a base of any suitable construction, which as shown, is of inverted channel shape, and has horizontal flanges 2 and 3 at its ends. The base preferably is made massive and is bolted or otherwise secured to suitable resilient vibration absorber or dampener elements 5 which rest on the floor. The vibration absorbers 5 (Figure 5) each comprise an inverted channel strip 6 with a hole 7 bored or punched therethrough, and having rubber pads 8 and 9 vulcanized or otherwise secured thereto on one of their faces respectively, and their period of vibration may be determined by suitable selection of their width. To the opposite faces are secured angle plates 10 and 11 having holes 12 formed therein by which the vibration absorbers may be bolted to the floor, if desired. The base 1 is secured to the channel strip 6 by bolts 13.

Figure 2:
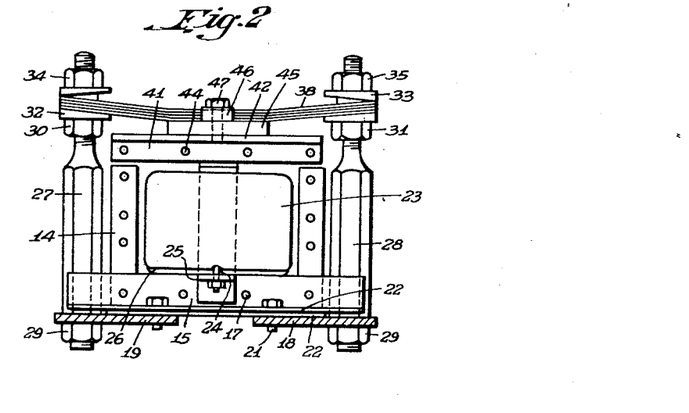
Figure 2 is an end view looking in the direction of the arrow II in Figure 1.

An electromagnet assembly comprises a core 14 in the shape of an E built up of laminated soft iron plates located between two angle bars 15 and 16, and rivets 17 (Figure 2) pass through the bars 15 and 16 and through the plates of magnet core 14 to hold them in assembled relation. Two brackets or plates 18 and 19 having the reenforcing flanges 20 thereon are formed integral with the base 1, and the magnet core 14 is secured to the plates 18 and 19 in spaced relation thereto by bolts 21 passing through the angle bars 15 and 16 and threaded into these brackets, a spacing plate 22 being interposed therebetween to determine the normal air gap. A coil 23 of wire surrounds the middle leg of the magnet core and is secured in position by suitable clips 24 passing through the angle plates 25 which may be welded or otherwise secured to angle bars 15 and 16, a resilient pad 26 of rubber or other suitable material being interposed between the coil and magnet base.

At the ends of the electromagnet two hexagonal side bars 27 and 28 of non-magnetic material, such as, non-magnetic stainless steel, are bolted to the brackets 18 and 19 by nuts 29 threaded onto the reduced lower ends of the bars. The upper ends of bars 27 and 28 are reduced and threaded at their upper ends to receive adjusting nuts 30 and 31 thereon, and the spring supports 32 and 33 have holes therein through which pass the reduced threaded ends of the side bars. The spring support 32 is adjustably held in position on nut 30 by lock nut 34, and the support 33 is held on nut 31 by lock nut 35.

The spring holders 32 and 33 are bifurcated as indicated at 36 and 37 and receive the prongs 39 and 40 of the spring 38 which is bifurcated at its ends. The spring 38 is shown as a laminated leaf or bar spring, but it may have any other suitable form, and may be composed of as many laminations as desired to give it the required stiffness or flexibility and strength. It will be observed that the ends of spring 38 are loosely supported at their ends in the spring holders 31 and 32 so that the ends are free to move axially in the springs supports.

The armature assembly comprises a bar 41 built up of laminated plates which are held in assembled relation between the angle plates 42 and 43 by means of rivets 44 passing therethrough. A motion transmitting or connecter member 45 is secured to the angle plates 42 and 43 in spaced relation to the armature bar 41 in any suitable manner, as by welding thereto, and the assembly comprising the armature 41 angle plates 42 and 43, and motion transmitting member 45 are secured to the spring 38 by a recessed clamp bar 46 and bolts 47 passing through the clamp bar and threaded into the motion transmitting member 45 and angle plates 42 and 43.

In the preferred modification shown, the motion transmitting member 45 is angle shaped and is bolted to a plate 50 welded to the bottom adjacent the open end 51 of conveyor trough 52. The opposite closed end 53 of the conveyor trough 52 has a bracket 54 welded or otherwise secured thereon to which is suitably bolted one end of a leaf spring 55, the other end of the spring being suitably bolted to a bracket 56 which may be integral with the base 1. The spring 55 supports and guides one end of the conveyor trough so that it will be capable of vibratory motion. In mounting the trough in this way and having the vibratory impulses directed at an angle to the trough, I obtain a multiplication of amplitude of vibration of the opposite or open end of the trough, as the spring 55 acts as a moving pivot for the trough. However, it will be understood that the rear end of the trough may be mounted for substantially horizontal movement in any other suitable manner.

I prefer to have spring 55 stiffer than spring 38. The spring holders 32 and 33 are movable longitudinally along the side bars 27 and 28 by adjustment of nuts 30, 34 and 31, 35, and it will be seen that when the spring holders are adjusted downward it tends to unbias spring 55 and moves the armature 41 toward the electromagnet 14 to reduce the air gap therebetween. This adjustment decreases the natural period of vibration of the vibratory element, which in this modification includes the conveyor trough, armature and springs 38 and 55. However, it will be understood that the term vibratory element has a broad significance and may mean the trough, motion transmitter or armature or any other portion or body mounted to vibrate. After the conveyor mounting has been adjusted to the desired natural period the air gap may be adjusted by changing plate 22 to one of suitable thickness a thinner plate increasing the air gap, and a thicker one decreasing the air gap. Also, by changing the number of leaves in the spring 38 or spring 55 the stiffness of the conveyor mounting, and therefore its natural period of vibration, may be preselected. It also will be observed that the trough 52 and the material therein being moved are above the spring and motor so that when material is added to the trough the tendency of this increased weight is to deflect the spring 38 toward the electromagnet and decrease the air gap and if the air gap is originally selected to allow for such deflection without having the armature strike the electromagnet, the amplitude of vibration of the trough will be increased. The vibration absorbers 5 which preferably follow a pseudo-harmonic law of vibration are adjusted or selected preferably to have a period of vibration substantially the same as the resilient elements of the conveyor with their load.

Figures 3, 4, 6, 6A:
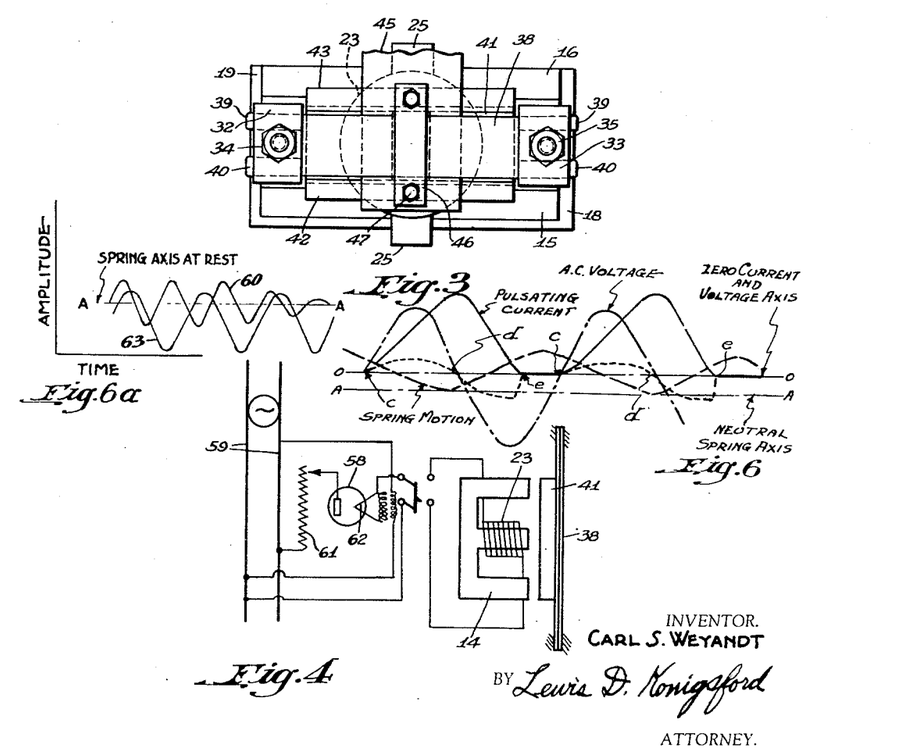
Figure 3 is a top plan view looking in the direction of the arrow III in Figure 1.
Figure 4 is an electrical wiring diagram with an electric motor schematically shown.
Figure 6 is an oscillograph illustrating the operation of the system shown in Figure 4 for one adjustment of the natural period.
Figure 6a is a vibrograph illustrating the vibratory motion of the system shown in Figure 4 for another adjustment of the natural period.

Referring to Figure 4, the thermionic valve 58 is connected into any suitable alternating current circuit represented generally by the numeral 59, which may be a commercial power line carrying alternating current, for example, at frequencies of 25, 30, 50 or 60 cycles per second, in such a way that unidirectional pulsations of current separated by a time interval of zero energy pass through the rheostat 61, and through the thermionic valve 58 allowing current to flow therethrough in one direction only. The cathode 62 of the thermionic valve may be heated by current supplied from any suitable source, such as the alternating current source 59. It will be understood that in place of the thermionic valve 58 valves of the dry disk, mercury and electrolytic type may be used.

The form of current wave produced by a thermionic valve in an inductive circuit is shown by the full line in Figure 6, in which it will be observed that there is a substantial period of zero energy between current impulse. Referring to Figure 6a, the curve 60 represents the natural or free vibrational movement of the armature, the line A—A being the spring axis with the spring at rest. It will be observed that the amplitudes of free vibration of the spring at its natural period are substantially equal on both sides of its neutral axis, and the time of deflection from the neutral axis is substantially equal to the time of restoration to the neutral axis. Curve 63 represents the forced vibration of the armature with the periodicity of the spring non-synchronous to the current impulses. Under such conditions the armature is forced to a maximum amplitude on one side of the neutral axis and is returned to and slightly beyond the neutral axis by the restoring force of the spring, thus resulting in an unbalanced or differential vibration. In Figure 6 the forced vibration of a spring having a periodicity of about 52 is represented, the current pulsations occurring 60 times per second. The alternating current voltage is shown by the dot and dash line, the pulsating current by the full line, the flux pulsations by the dotted line and the spring vibration by the double dash and dot line. It will be apparent from this figure that the flux begins to build up at the instant the current impulse begins and the flux rises gradually to a maximum and then gradually dies down to zero when the current impulse reaches a maximum value, then begins to build up again in the opposite direction until it abruptly falls off to zero as the current impulse reaches zero. However, with a non-polarized armature the flux pulsations always produce an attractive force. The neutral axis of the spring vibration is the line A—A, and therefore the maximum amplitude of the spring vibration occurs during the period of zero current and the flux pulsation c, d arrests and reverses the spring motion, the starting impulse being developed by the flux pulsation d, e.

The operation of the apparatus now will be described. When a pulsating current is passed through coil 23 the electromagnetic force set up in the magnet 14 attracts the armature 41 against the resilient resistance of springs 38 and 55, and when the current wave dies down sufficiently the inertia of the moving parts continue the motion until the built up restoring force in the springs gradually reverses the motion and retracts the armature and thus moves the trough 52 which is connected thereto. If the natural period of the inclined springs is properly selected or adjusted to be less than the recurrence period of the electromagnetic impulses, on continued flow of current through the solenoid a vibratory differential motion of the armature, trough and spring is set up, which moves the trough 52 with a differential motion, of relatively large amplitude and any material placed on the trough, such as sand, powder, or articles of any kind, will be conveyed continuously in one direction. The vibration absorbers 5 are so selected with respect to the mass of the base 1 that the base and absorbers have a free vibration period equal to the natural period of the conveyor mounting whereby the vibration amplitude of the conveyor is greatly increased. The vibration absorbers thus are tuned to utilize reactive forces in the base to assist the conveyor action.

The natural periodicity of the conveyor mounting preferably is sub-synchronous to the recurrence period of the electromagnetic impulses, so that the conveyor at all times responds to the electromagnetic impulses. The rate of feed of the conveyor therefore can be quickly changed by adjustment of the rheostat 63 which governs the current supplied to the solenoid 19 of the motor and thus governs the amplitude of vibration thereof.

Figures 5, 7, 13, 17:
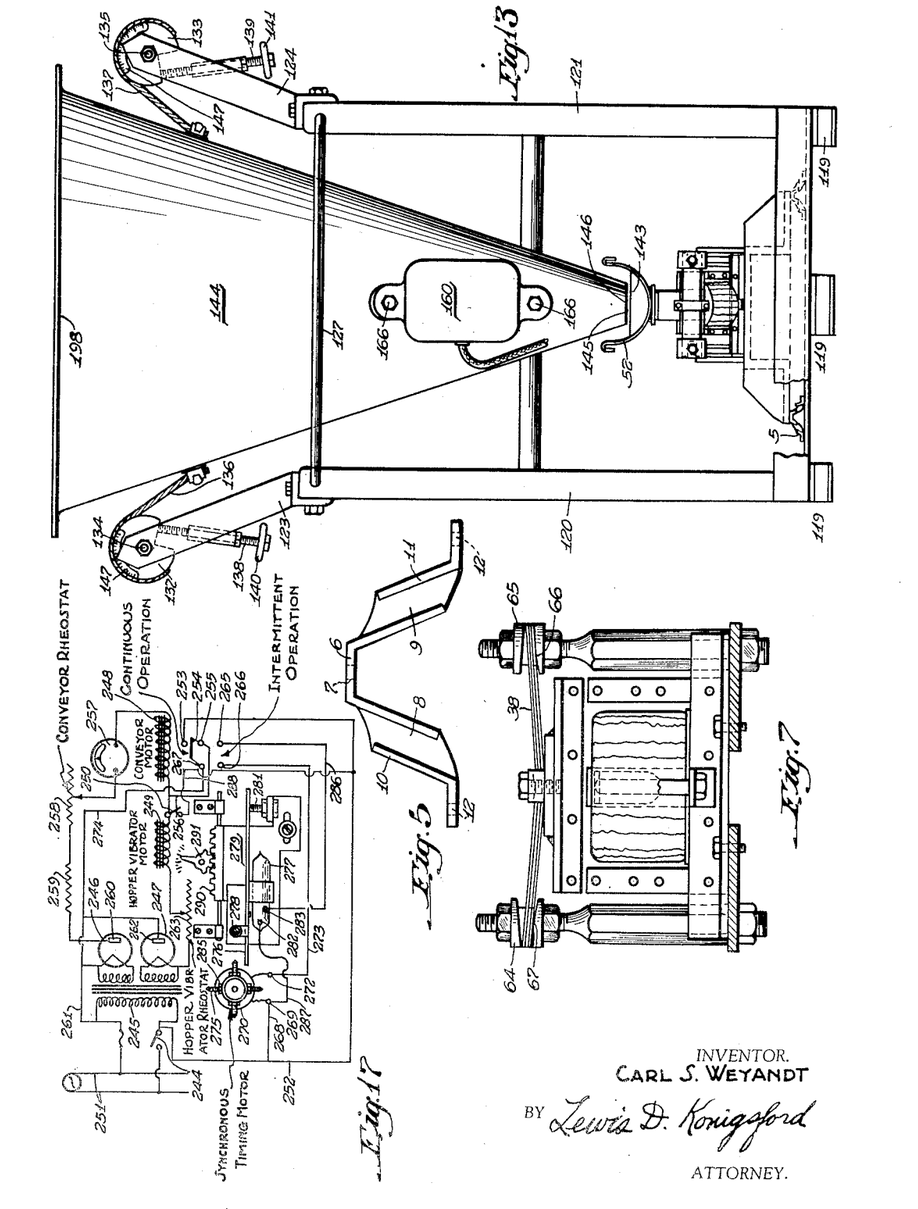
Figure 5 is an end elevation view on an enlarged scale of a preferred type of vibratory member.
Figure 7 is a fragmentary view of a modification of the motor shown in Figures 1 to 3 illustrating a modified type of spring support.
Figure 13 is an end view of Figure 12 looking in the direction of the arrow XIII in Figure 12.
Figure 17 is an electrical diagram with certain parts schematically shown for operating the modification shown in Figures 12 and 13 at a predetermined rate continuously or intermittently.

In the modification shown in Figure 7 wherein like parts are correspondingly numbered, the spring supports 64 and 65 have their lower supporting ends rounded as indicated at 66 and 67 so that the greater the spring is flexed, the shorter will be the free portion of the spring and the lesser will be its natural period of vibration. Thus the springs have a variable natural period which is dependent on the amplitude of vibration. This arrangement is particularly desirable as it allows a very slow smooth operation as well as a very rapid one. It will be understood that any desired number of leaves may be used in the spring 38, and in some instances I prefer to use so many leaves that the friction between them causes a dampening of the natural period of vibration so that when the armature is attracted by the electromagnet and released the spring merely returns the armature to zero position where it comes to rest until it is deflected by the next electromagnetic impulse.

Figure 8:
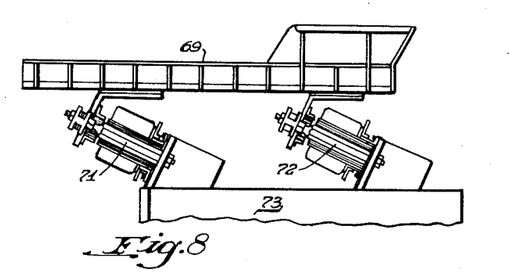
Figure 8 is a fragmentary side view of a further modification employing two motors.

In the modification shown in Figure 8, the conveyor trough 69 is made extra long and is operated by two reciprocatory motors designated generally by the numerals 71 and 72, being front and rear respectively in tandem which are constructed and mounted exactly like the motor 55, on a base 73, the armature springs of the two motors entirely supporting the conveyor trough 69. This modification may be employed with or without a hopper, as desired. Where the conveyor trough is extra wide, the trough may be mounted on two front motors in line and two rear spring supports in line, or for unusually wide and long troughs four motors in two tandem pairs may be used.

Figure 9:
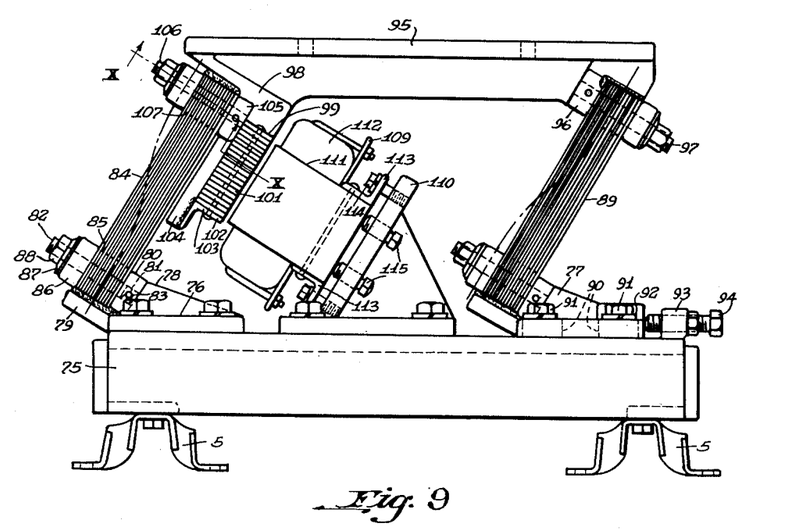
Figure 9 is a side elevation of a further modification of a reciprocatory motor for operating a conveyor.
Figure 10:
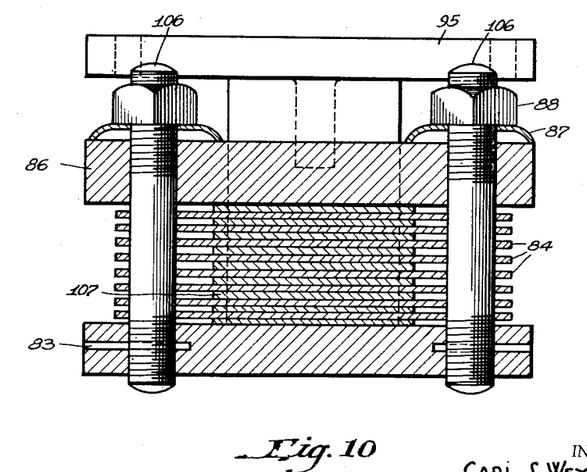
Figure 10 is a section view on line X—X of Figure 9.

In the modification shown in Figures 9 and 10, there is shown a base 75 in the form of an inverted channel member having spring anchors 76 and 77 secured thereto. The front spring anchor 76 is bolted to the base 75, but may be integral therewith and comprises a casting having a base plate and a central vertical reenforcing rib 78 and an inclined portion 79 of less width than the plate. A cross piece 80 integral with the plate has holes 81 tapped therein into which are threaded the studs 82 held in place by pins 83. The front spring 84 is made up of a plurality of rectangular spring leaves with rectangular transverse spacers 85 therebetween which are stacked on the studs 82 alternately with the spring leaves therebetween. These leaves may be in stacks of any desired numbers of leaves and spacers to provide the desired dampening action to prevent undesirable resonance. A transverse retaining bar 86 is placed on the stack of springs and spacers and the retaining bar, spring leaves and spacers are held in assembled relation by the cupped spring washers 87 and nuts 88 on the ends of studs 82.

The rear spring anchor 77 is identical with the front spring anchor to the extent above described, and the rear spring assembly 89 is secured thereto in similar manner. The rear anchor has four slots 90 therein through which pass the cap screws 91 threaded into the base and locked against accidental release by spring washers 92. A plurality of lugs 93 may be formed integral with the base 75 and are bored and threaded to receive adjustment screws 94.

A carrier 95 is secured to the upper ends of the springs 84 and 89 to support a feeder trough, weight, or other kind of body to be vibrated. The carrier is in the form of a half I-beam in transverse section and at its rear has integral extensions 96 which receive the studs 97 upon which are strung the rear spring leaves 89, spacers and retaining bar similar to that previously described. The front end of carrier 95 has an extension 98 to which is welded or otherwise secured a plate 99 and the armature laminations 101 are secured thereto between the plate 99 and the L-shaped retaining bar 102 by suitable non-magnetic rivets 103, the bar 102 being welded to tongue 104. The tongue 104 integral with carrier 95 has the extensions 105 to receive the studs 106 upon which the upper ends of the springs 84 and spacers 107 are strung and secured in position.

From the description so far pursued, it will be apparent that the carrier 95 is supported for vibrational movement on the springs 84 and 89, the lower ends of which are securely anchored to the base 75. The natural period of vibration of the carrier and its support may be adjusted by loosening cap screws 91 and moving the anchor member 77 along the base by the adjustment screws 94. This brings the lower end of spring 89 closer to the lower end of spring 84 thereby bowing both springs inversely proportional to their relative stiffness as shown on an exaggerated scale in Figure 9 by the dot and dash lines, and results in a change in the period of free vibration of the carrier 95 and its supporting springs. The springs 84 and 89 may be initially flat or may be initially bowed, as desired. Preferably, the mass of the carrier 95 is made as light as feasible so that the natural period of vibration will be dependent largely on the springs themselves, thus rendering the apparatus relatively insensitive to changes in mass of the carrier 95 or of the body secured thereto. However, when used as a vibrator a heavy mass may be secured to carrier 95 and the period of free vibration may be adjusted with relation to the body or object to be vibrated to which the base 75 will be secured, so as to obtain the desired vibration. When thus used the vibration absorbers 5 are not used, the base being secured directly to the object to be vibrated, the vibration imparted to the object being due to the inertia of the vibrating mass.

Figure 11:
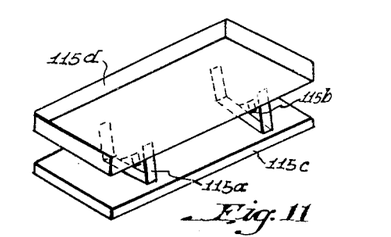
Figure 11 is a diagrammatic view showing the invention applied with two motors in parallel.

The carrier 95 which comprises the movable part of the reciprocatory motor has the armature 101 integral therewith and the stator part 109 is secured to a suitable base plate 110 which may be integral with or bolted to the base 75. The electromagnet core 111 is E-shaped and has a coil 112 wound around the middle leg of the E. The magnet is riveted to L bars 113 by which it is bolted by bolts 114 to the base plate 110, and the screws 115 may be used to elevate or lower the magnet and thus set the air gap between the armature and magnet as desired. In the modification diagrammatically shown in Figure 11 two or more motors 115a and 115b are employed in parallel on a base 115c for a wide, short conveyor 115d. The advantage of this construction lies in that the free period of vibration of the motors may be adjusted to equality so that the rate of feed is uniform along the full width of the trough. The motor shown in Figures 9 and 10 is particularly suitable for this arrangement, or for that shown in Figure 8.

In the modification shown in Figures 12 to 15 I have illustrated a preferred form of apparatus which I designate as a feeding machine. In this modification wherein like parts are designated by the same reference numeral, a frame designated generally by the numeral 116 is made up of angle bars welded or otherwise suitably secured together. The bottom of the frame is made of four angle bars 117 with one face 118 turned inward and the other face vertical, and the conveyor base 1 is suitably supported on the inwardly turned faces 118 thereof. The conveyor base 1 is set on the vibration absorbers 5, of which any desired number may be employed, so that the vibrations of the base 1 are not transmitted to the frame 116. The frame 116 is also set upon vibration absorbers 119 which are like the vibration absorbers 5, and serve to prevent vibrations in the floor from affecting the frame or the members supported thereon.

Figures 12, 14:
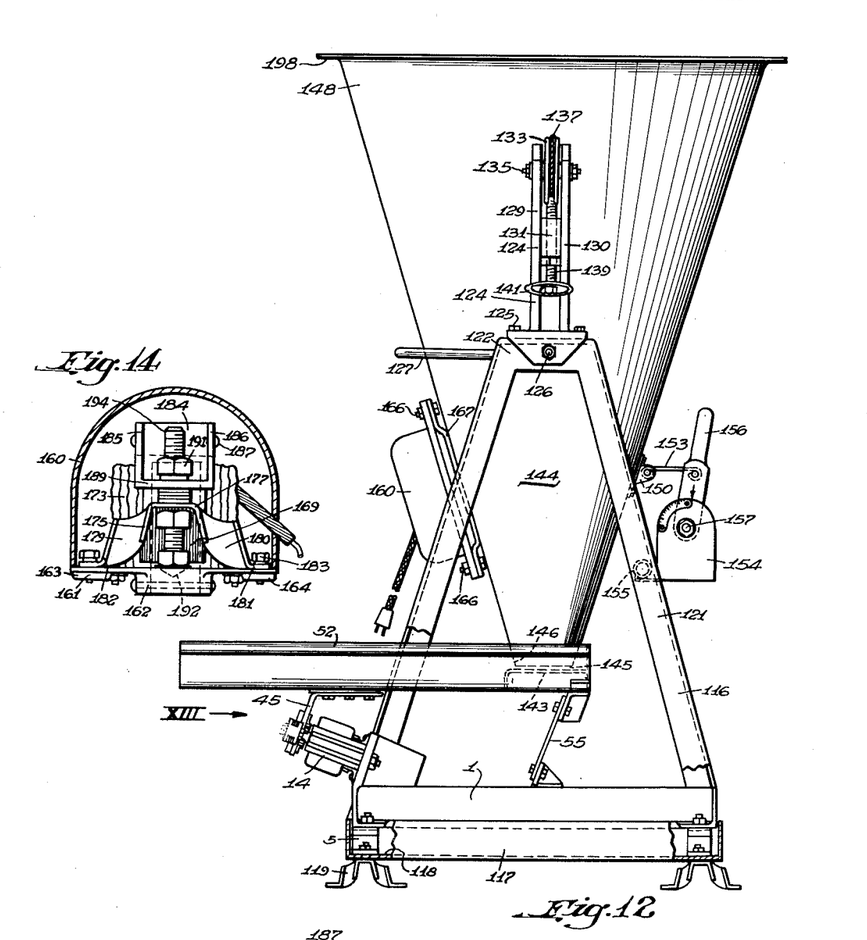
Figure 12 is a side view of a further modification.
Figure 14 is an end view with the casing in section of a preferred hopper vibrator.

The frame 116 has two pairs of side members 120 and 121 which have cross pieces 122 at their upper ends, and support the hopper brackets 123 and 124 thereon. As the two hopper brackets are constructed alike only one will be described in detail. The bracket 124 has an inverted L-shaped foot which is bolted to the cross piece 122 at the top by bolts 125 and at the sides by bolt 126. A curved bar or pipe 127 connects the two side members 120 and 121 of the frame to provide a reenforcement for the top portion thereof. The upright part of the hopper bracket 124 is bifurcated to form spaced bars 129 and 130 between which is welded or otherwise secured the inclined internally threaded sleeve 131. Segmented grooved pulleys 132 and 133 are rotatably journalled on bolts 134 and 135 passing through suitable transverse holes in the upper ends of bars 129 and 130, and cables 136 and 137 are secured to the respective pulleys at one end thereof by suitable clamps, the other ends thereof being clamped to the wall of conical hopper 144. Adjustment screws 138 and 139 are threaded through threaded sleeves 131 with their ends abutting one segmental face of the pulleys 132 and 133 respectively. The other ends of screws 138 and 139 carry hand wheels 140 and 141. As shown in Figures 1, 12 and 13 the conveyor trough 52 has a rounded bottom, and I provide a suitable table or platform 143 near the closed end of the trough. It will be apparent that the hopper 144 is supported by the cables 136 and 137 with its smaller end over the table 143 and it will be apparent that by rotating pulleys 132 and 133 the hopper may be raised or lowered with respect to the table 143. The space 145 between the end 146 of the hopper and the table 143 constitutes a controllable feed opening, which may be varied by varying the hopper with respect to the table. The ends of the bars 129 and 130 may be pointed to cooperate with suitable graduations 147 on the pulleys to insure correct adjustment thereof.

It will be understood that where a chute having a flat bottom is used the table 143 may be omitted and the lower end 146 of the hopper may cooperate with the bottom of the trough. Material is introduced into the hopper 144 at its larger end 148 and is discharged from the hopper onto the conveyor trough 52 through the feed opening 145, the conveyor acting as a vibratory gate and the reciprocations of the conveyor chute 52 carry the material along and discharge it from the open end thereof in a continuous stream into any suitable tank or receptacle.

A clevis block 150 secured to the hopper has a bolt 151 therein about which is located a grooved rubber grommet (not shown), one looped end of rod 153 being swivelled about this grommet. A clevis bracket 154 is welded or otherwise secured to the cross piece 155 of the frame 116. The adjustment handle 156 is in the form of a U and a bolt 157 passing through the base of the U and through the clevis bracket 154 serves as a pivot for the handle 156. A second grommet (not shown) is located on a bolt 159 passing through the arms of the U handle 156, and the other end of rod 153 is looped over the second grommet. A nut on the end of bolt 157 clamps the handle 156 in adjusted position. By means of this construction, by pivoting the handle 156 about its axis 157 the hopper may be tilted from the vertical as desired to adjust the feed opening 145 from the end or from the top surface of table 143. The clevis bracket 154 is calibrated, and the index mark on the handle 156 cooperates therewith to insure correct setting of the hopper.

From the foregoing description it will be apparent that the hopper 144 is substantially insulated from the frame 116 so as to practically prevent the transmission of vibration from the hopper to the frame. The rubber grommets 152 and 158 prevent the transmission of vibration through rod 153 to the frame, and the cables 136 and 137 prevent the transmission of vibration to the hopper supports and thence to the frame. Similarly, the vibration absorbers 5 prevent the vibrations of base 1 from being transmitted to the frame 116 and thence to the hopper 144, and the vibration absorbers 119 insulate the whole apparatus from any external vibration interference.

Figure 15:
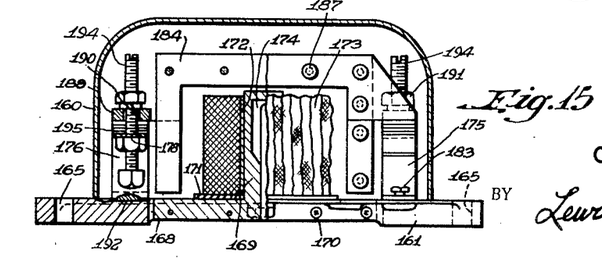
Figure 15 is a side view partly in section of the vibrator shown in Figure 14.

To overcome any tendency of the material in the hopper 144 to form a bridge or clog the hopper, I provide a vibrator designated generally by the numeral 160 which has a base 161 of cast steel or other suitable material and has a thickened central body portion or rib 162 and integral flanges 163 and 164, bolt holes 165 being bored through the ends of the base 161 through which pass the bolts 166 by which the vibrator is secured to a plate 167 bolted onto the wall of the hopper 144. A rectangular opening 168 is formed centrally of the base 161 and receives a laminated electromagnet core 169 substantially in the shape of an inverted T. The core 169 is secured to the base 161 by cutting the base in half on its long axis, inserting the core 169 in place, and riveting the two halves and the core together by rivets 170 passing through the core and central rib 162. The two halves of the base then are reunited by welding. In this way a very rigid structure is built up in which the magnet core 169 is securely held to the base 161.

A cushioning pad 171 of rubber or other suitable material is placed on the base over the core 169, the core being surrounded by a layer of insulation fabric 172, and a coil 173 of insulated wire wound horizontally surrounds the leg of the core. A pair of clips 174 suitably insulated from the coil are bolted to the base 161 to hold the wire coil 173 securely in place on the base. Adjacent each end of the base are two supports for the armature indicated generally by the numerals 175 and 176. As these supports are alike in construction, only one of them will be described in detail. The supporting member 175 comprises an inverted channel shaped metal strip 177 with a hole 178 bored centrally therethrough, and resilient members which preferably are nonmagnetic are secured thereto. The preferred construction of resilient members comprises rubber pads 179 and 180 vulcanized or otherwise suitably secured to each side of the channel strip 177. The pads are right and left hand and the faces thereof are substantially parallel, the ends being cut in the form of an arc. Angle strips 181 and 182 are vulcanized to the opposite faces of the pads, and are bolted to the base 161 by bolts 183 thereby holding the armature supports securely in place at opposite ends of the core 169.

The armature 184 is of laminated construction and is substantially in the shape of a C on its side. The laminated plates of the armature 184 are enclosed by thicker side plates 185 and 186 on either side which extend part way along the legs of the C and beyond the armature proper, all the plates being held in assembled position by suitable rivets 187. Cross bars 188 and 189 having bolt holes 190 therein are positioned between the side plates 185 and 186 and are welded thereto, and the armature assembly is secured to the resilient members 175 and 176 by bolts 194. Spacing washers 195 are interposed between the horizontal bars 188 and 189 and the tops of the channel members 177 to space the armature a suitable distance to provide an air gap from the end of core 161, and the nuts 191 hold the armature, spacers and channel members in assembled position. By reason of the nonmagnetic properties of the armature supports 175 and 176 the possibility of the electromagnetic flux being shunted around the air gap into the armature is eliminated.

The vibratory mass, which term includes the armature 184 and the vibratory portions of supports 175 and 176 has a period of vibration out of resonance with the electromagnetic impulse, whereby it vibrates with a differential motion, and I prefer to construct the pads 179 and 180 so that the vibratory mass has a period of about two-thirds to eleven-twelfths that of the electromagnetic impulse, the exact relation depending on the nature of the pulsating current and the amount of differential motion desired.

Ordinarily, when the armature is vibrating, the amplitude of its vibration is such that the heads of bolts 194 do not strike the base 161, and the armature 184 does not strike the electromagnet core 169. However, the vibration may be adjusted to a greater amplitude if desired by increasing the voltage supplied to the coil 173 so that the vibrator operates on the impact principle, or the bolts 194 may be adjusted to bring their heads closer to the base 161 so that they will strike the base. Two surfaces 192 of Stellite or similar hard preferably nonmagnetic material are welded in suitable depressions to the cast steel base in line with the bolts 194 so that the heads of bolts 194 will strike these surfaces under such conditions. The bolt heads 194 also may be coated with Stellite or similar material if desired. The nonmagnetic contact surfaces 192 and the Stellite coating on the bolt heads 194, if used, also prevent or limit shunting of the magnetic flux under conditions of operation where impact occurs.

The preferred construction of hopper 144 is conical so that there are no angles in the walls to interfere with transmission of the vibration, the hopper being built up of two longitudinal half sections riveted together and flanged at the wider end. The vibrator 160 is of the inertia type as distinguished from the impact type, and by the use of a conical hopper the vibration of the hopper wall is resolved into two component vibrations at right angles to each other. The vibrator 160 is located a suitable distance from the smaller end 146 of the hopper so that the vibrations of the hopper are substantially uniformly distributed about its periphery at the smaller end, this action being assisted by the top flange 198 of the hopper which increases the rigidity of the larger end and forces the vibrations toward the smaller end. The conveyor table or platform 143 vibrates across the open mouth 146 of the hopper 144 and moves material through the feed opening 145 onto the conveyor trough, the vibrator 160 meanwhile maintaining the material in the hopper in a state of flux so that it responds to the feeding movements of the conveyor trough. The differential motion feeds the material toward the open end of the conveyor in a continuous stream. Due to the axis of vibration of the armature being at an angle to the bottom of the conveyor the action is one of successively rapidly withdrawing the conveyor from under the particles of material in one direction and more slowly returning the conveyor to pick up the particles of material at a different point thereon and move them ahead. The rate of feed of the conveyor can be adjusted for materials of various natures by rotating the adjustment screws 138 and 139 to raise or lower the hopper with relation to the conveyor table 143 and thus adjust the feed opening 145. The feed opening can also be adjusted by loosening bolt 157 and moving handle 156 to change the inclination of the hopper axis and thus change the size of the feed opening 145.

The hopper being supported by the frame 116, the conveyor trough 52 carries only a small part of the load of material therein. Any increase in the load on the conveyor trough has the tendency to load the springs 38 and 55 and thus bring the armature 41 closer to the magnet 14 to decrease the air gap and thus increase the power of the electromagnet, which may automatically compensate for change in load and thus maintain the rate of feed substantially uniform under varying conditions of load. The rate of feed of the conveyor can be adjusted by means of the hopper adjustment, or by change in the amplitude of vibration of the conveyor motor which occurs with change in current supplied thereto, an increase in amplitude increasing the rate of feed.

Figure 16:
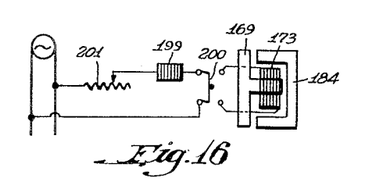
Figure 16 is an electrical diagram showing a modified asymetrical conductor.

In Figure 16 I have illustrated a circuit employing a copper oxide rectifier 199 for operating the hopper vibrator motor, but it will be understood that in this circuit the copper oxide rectifier may be replaced by any other suitable type of rectifier, such as, a mercury vapor rectifier, a thermionic valve, or copper sulfide disks. When the switch 200 is closed a pulsating current is sent through the magnet winding 173, the current wave having substantially the form shown in Figure 6, the current strength being controlled by the rheostat 201. The current passing through the coil 173 sets up an electromagnetic impulse which causes the magnet core 169 to attract the armature 184 against the resilient resistance of the rubber pads 179 and 180, which yield to allow movement of the armature. As the current impulse dies down to zero, and during the interval before the next current impulse, the resistant force built up in the rubber pads 179 and 180 retracts the armature 169 from the electromagnet 184.

In Figure 17 I have shown an electrical diagram for continuously or intermittently operating the vibratory conveyor, the hopper, vibrator and conveyor motor preferably being operated by complementary half waves of a rectified alternating current source. Upon closing the filament excitation switch 244, the primary coil of heater transformer 245 receives current from any suitable alternating source, which may be commercial power lines 251, the filaments of the thermionic valves 246 and 247 being heated by the secondary coils of the transformer, the cathodes and anodes of tubes 246 and 247 being interconnected to produce two series of direct current impulses. The conveyor vibratory motor is designated by the inductance 248, and the hopper vibrator motor by the inductance 249. One half wave of circuit is through switch 244, lead wire 252 to the terminal 253 of switch 254. When it is desired to operate the vibratory conveyor and hopper motor continuously the switch 254 is thrown to connect terminals 253 and 255 and switch 250 is opened, the current wave passing by lead 256 through inductance 248, through the ammeter 257, the rheostat 258 and fixed resistance 259 through the anode 260 of the thermionic valve 246. This thermionic valve only allows one half wave to pass therethrough. The other half wave circuit is through the lead wire 261, through the anode 262 of the thermionic valve 247, thence through calibrated rheostat 263 and inductance 249, by lead 256 to switch contact 255, thence through switch 254 to contact 253 and through wire 252 and switch 244 back to power wire 251.

When it is desired to operate the reciprocatory conveyor intermittently, the switch 254 is moved to contact terminals 265 and 266. In this position of the switch, the current circuit is through lead 252 and lead 268 to the terminal 269 of the synchronous motor 270; and from the other terminal 272 thereof through lead 273 to the switch contact 266, through the switch 254 to terminal 267 and from thence by leads 274 and 261 to the power wire 251 of the alternating current source. The synchronous motor 270 therefore is in continuous operation at an accurate chronometric speed in this position of the switch.

The synchronous motor 270 drives a timing member shown diagrammatically having a plurality of projecting threaded switch actuator pins 275, shown as four in number. However, any desired number of actuator pins may be employed. The actuator pins 275 are adapted to engage a support 276 for a mercury switch 277 which is pivotally supported at 278 on a panel 279, and when an actuator pin 275 engages the end of support 276 the support is tilted downward thus causing the mercury to flow to the left and establish communication between the electrodes 282 and 283 of the mercury switch. When the actuator pin 275 passes the supports 276 the weight of the support returns it to the position shown resting on the adjusting screw 281. The actuator pins 275 may be adjusted to compensate for wear by loosening lock nut 285 thereon, threading the actuator into or out of the supporting ring as desired, and again tightening the lock nut.

In the position of the mercury switch 277 shown in Figure 17 and with switch 254 in intermittent operation position, the mercury switch is open and no current flows through the inductances 248 and 249. When the mercury switch is in tilted position one half wave flows from the rectifier tube 247 through rheostat 263, inductance 249 to switch terminal 255 and through the switch 254 to terminal 265, thence through lead wire 286 to electrode 283, through the mercury to electrode 282, thence by lead wires 287, 268 and 252 to the main conduit. Similarly, the other half wave circuit is from main conduit 251, through leads 252, 268 and 287 to the mercury switch 277 thence by lead 286 to the switch 254, and thence through lead 256 to inductance 248 and ammeter 257 to rectifier tube 246.

As long as the actuator pins 275 maintain the switch support 276 in tilted position alternate half waves of rectified current will flow through the inductances 248 and 249 to operate the reciprocatory conveyor and the hopper vibrator respectively. As there are four actuator pins 275 and if the synchronous motor 270 rotates them once in each minute, there will be four periods of operation of the vibratory conveyor and hopper vibrator and four periods of idleness in every minute. The duration of each period of operation can be determined by sliding the panel 279 horizontally so as to govern the distance by which support 276 extends into the path of the actuator pins 275. The further this support extends into the actuator pin path the longer will be the operative periods of the conveyor and hopper vibrator. Preferably, the timing is such that the circuit is opened during periods of zero current. Thus, in the case of a sixty cycle alternating current, if the interruption occurs four times per minute it will be after the nine hundredth, eighteen hundredth, twenty-seven hundredth and thirty-six hundredth pulsation in that particular minute. The calibration means for the switch comprises a rack 290 and a gear wheel 291 in mesh therewith and carrying an indicator which shows the position of the switch support with relation to the actuators in time units of contact.

Figure 18:
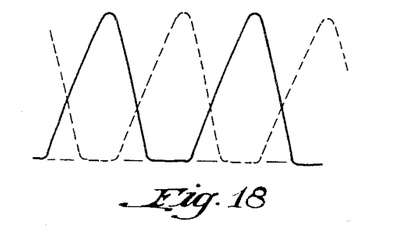
Figure 18 is an oscillograph illustrating the separate double rectified current waves employed in the circuit shown in Figure 17.

The current wave form employed in the circuit shown in Figure 17 is illustrated diagrammatically in Figure 18, wherein the full line curve represents one half wave of the rectified current, and the dotted line curve represents the other or complementary half wave, the two curves overlapping slightly due to the inductive reactance of the circuit.

If desired, the hopper vibrator motor may be operated continuously, and the conveyor motor operated intermittently. This is accomplished when the switch 254 is moved to intermittent operation position and switch 250 is closed. With this arrangement current flows continuously through the hopper vibrator motor circuit comprising anode 262, rheostat 263, inductance 249, switch 250, lead wire 288 and lead wire 252. The operation of the conveyor motor is as previously described with the switch 254 in intermittent operation position.

In operating the feeder machine, the line switch 244 is first closed to heat the filaments of the thermionic tubes 246 and 247, the switch 254 is thrown to the desired position, and switch 250 is also thrown to open or closed position as desired. The amplitude of vibration of the conveyor is governed by adjustment of the rheostat 258 which governs the current supplied to the coil of the conveyor motor, and the amplitude of vibration or force of vibration of the hopper vibrator is governed by adjustment of the rheostat 263 which preferably is calibrated. The ammeter 257, which indicates the setting of the rheostat 258, may be calibrated to show the rate of feed in units of weight or volume per unit of time. The continuous operation system is utilized for all rates of feed of certain materials which are easily handled, and the intermittent operation system is utilized principally for very low rates of feed below the rate at which a continuous feed can be maintained at a uniform rate. For example, a machine built according to the modification shown in Figure 12 is capable of feeding at the rate of a few ounces per hour up to several thousand pounds per hour, depending on the nature of the material being handled. This universal ability of the machine is illustrated in the following table of rates of feed for a given machine:

| Material | Per hour minimum rate | Per hour maximum rate |
| --- | --- | --- |
| | Pounds | Pounds |
| Sand | 1 | 10,000 |
| Pebble lime | 2 | 4,000 |
| Alum | ½ | 800 |
| Soda ash | ½ | 600 |
| Activated carbon | ½ | 100 |

The above ratings are conservative and the feeder machine may be operated in many instances below the above minimum rates or above the maximum rates, and may be operated at any desired rate of feed between the above limits.

When it is desired to operate the feeder machine at an intermittent rate, the calibration means 291 is set for the desired duration of operation, and the switch 254 is thrown to the intermittent operation position so as to operate the conveyor motor and hopper vibrator motor intermittently for the desired duration as determined by the setting of calibration means 291. In the case of some materials that are difficult to handle, it may be desired to operate the hopper vibrator continuously, and the conveyor intermittently, and for this purpose the switch 250 is opened. It also will be understood that any of the various modifications herein disclosed may be incorporated in one machine.

By the term "unobstructed vibration" as used in the specification and claims I mean that the vibrating portions of the motor structure carried by the springs or other resilient means do not impact any other parts of the motor structure, although it will be understood that said vibrating portions may contact with the work being done. By the term recurrence period of the current impulses I mean the time interval from the instant one current impulse begins until it reaches a maximum, returns to zero and remains at zero until the next impulse occurs. By the term natural or free period of vibration of a vibratory element I mean the time interval beginning at the neutral axis during which the resilient element moves to a maximum amplitude in one direction, returns and passes through the neutral axis, reaches a maximum amplitude in the opposite direction and returns to the neutral axis. However when the vibration occurs wholly on one side of the neutral axis the period of vibration is the time from the instant the vibratory element starts to move in one direction until it returns to its starting point. By the periodicity of the resilient element I mean the number of times in which the natural or free vibration occurs in one second.

As the invention may be embodied in other specific forms without departure from the spirit or essential characteristics thereof, the present preferred embodiment is therefore to be considered as illustrative rather than restrictive of the invention.

I claim:

1. A vibratory conveyor comprising a base, a plurality of inclined leaf springs secured at one end thereof to said base, a conveyor member secured at the opposite ends of the springs and supported thereby for vibrational movement, an armature operatively secured to said conveyor member, an electromagnet, and means to deflect said springs relatively to each other to change the free period of vibration of said conveyor member, armature and springs.

2. A vibratory conveyor comprising a conveyor trough, resilient means for supporting said trough for unobstructed vibration, an electromagnet adjacent thereto, a source of alternating current, and static rectifier means unaffected by the amplitude of vibration of the conveyor trough for selecting current impulses separated by substantial periods of zero current from the alternating current source for actuating said electromagnet to vibrate said conveyor trough.

3. A vibratory conveyor comprising a conveyor trough, resilient means for supporting said trough for unobstructed vibration, an electromagnet adjacent thereto, a source of alternating current, and static rectifier means unaffected by the amplitude of vibration of the conveyor trough for selecting current impulses separated by substantial periods of zero current from the alternating current source for actuating said electromagnet to vibrate said conveyor trough, said resilient means and trough having a period of free vibration sub-synchronous to the recurrence period of the current impulses.

4. A reciprocatory motor comprising a member to be vibrated, resilient means operatively secured to and supporting said member for unobstructed vibration, an electromagnet adjacent thereto, a source of alternating current, and static rectifier means unaffected by the amplitude of vibration of said member for selecting current impulses separated by substantial periods of zero current from the alternating current source for actuating said electromagnet to vibrate said member.

5. A reciprocatory motor comprising a member to be vibrated, resilient means operatively secured to and supporting said member for unobstructed vibration, an electromagnet adjacent thereto, a source of alternating current, and static rectifier means unaffected by the amplitude of vibration of said member for selecting current impulses separated by substantial periods of zero current from the alternating current source for actuating said electromagnet to vibrate said member, said resilient means having a period of free vibration sub-synchronous of the recurrence period of the current impulses.

6. A vibratory conveyor comprising a conveyor element, an armature operatively secured to the conveyor element, a base, means for supporting said conveyor element including a spring having its ends loosely supported by said base and having its middle operatively connected to the conveyor element, an electromagnet secured to the base adjacent said armature, a source of alternating current, and static rectifier means for selecting current impulses separated by substantial periods of zero current from the alternating current source for actuating the electromagnet.

7. A vibratory conveyor comprising a conveyor element, an armature operatively secured to the conveyor element, a base, means for supporting said conveyor element including a spring having its ends loosely supported by said base between generally tapered bearing surfaces to provide a variable contact therewith depending on the deflection thereof and having its middle operatively connected to the conveyor element, an electromagnet secured to the base adjacent said armature, a source of alternating current, and static rectifier means for selecting current impulses separated by substantial periods of zero current from the alternating current source for actuating the electromagnet.

8. A vibratory conveyor comprising a conveyor element, an armature operatively secured to the conveyor element, a base, a flexible member operatively secured at one end to said base and having its opposite end operatively secured to the conveyor element, a leaf spring having its ends supported by said base and having its middle operatively connected to the conveyor element, an electromagnet adjacent said armature, a source of alternating current, and static rectifier means for selecting current impulses separated by substantial periods of zero current from the alternating current source for actuating the electromagnet.

9. A vibratory conveyor comprising an impervious conveyor trough, resilient means for supporting said trough for unobstructed vibration, an electromagnet adjacent thereto, a source of alternating current of predetermined frequency, a rectifier for selecting current impulses separated by substantial periods of zero current from the alternating current source for actuating said electromagnet to vibrate said conveyor trough and adjusting means to statically deflect said resilient means for adjusting the free period of vibration of said conveyor.

10. The combination comprising a conveyor trough to be vibrated, leaf spring means supported at its ends and secured to said conveyor trough at its middle portion, a second leaf spring means secured to said conveyor trough at one end thereof and having its other end fixedly supported, the conveyor trough being supported entirely by said leaf springs, means for adjusting the position of one spring relative to the other spring to deflect said springs and adjust the period of free vibration of said conveyor trough, and electromagnetic means for vibrating said conveyor trough.

11. A vibratory conveyor comprising a conveyor trough, resilient means for supporting said trough for unobstructed vibration, an electromagnet adjacent thereto, a source of alternating current, and static rectifier means unaffected by the amplitude of vibration of the conveyor trough for selecting current impulses of one polarity separated by substantial periods of zero current from the alternating current source for actuating said electromagnet to vibrate said conveyor trough.

12. A reciprocatory motor comprising a member to be vibrated, resilient means operatively secured to and supporting said member for unobstructed vibration, an electromagnet adjacent thereto, a source of alternating current, and static rectifier means unaffected by the amplitude of vibration of said member for selecting current impulses of one polarity separated by substantial periods of zero current from the alternating current source for actuating said electromagnet to vibrate said member.

13. A reciprocatory motor comprising a base adapted to be connected to an object to be vibrated, an electromagnet carried by said base, a reciprocable armature member, one or more resilient members supporting said armature member for unobstructed vibration and connecting said armature member and base for transmitting vibrations of the armature member to the base, a source of alternating current, and static rectifier means unaffected by the amplitude of vibration of said armature member for selecting current impulses separated by substantial periods of zero current from the alternating current source for actuating said electromagnet to vibrate said armature member.

C. S. WEYANDT.